(12) United States Patent
Argoitia et al.

(10) Patent No.: US 7,608,330 B2
(45) Date of Patent: Oct. 27, 2009

(54) HIGH CHROMA OPTICALLY VARIABLE COLOR-SHIFTING GLITTER COMPRISING PARTICLES HAVING INTERFERENCE STRUCTURE COATING

(75) Inventors: Alberto Argoitia, Santa Rosa, CA (US);
Kent E. Coulter, Santa Rosa, CA (US);
Roger W. Phillips, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 426 days.

(21) Appl. No.: 11/363,420

(22) Filed: Feb. 27, 2006

(65) Prior Publication Data

US 2006/0228553 A1  Oct. 12, 2006

Related U.S. Application Data

(60) Continuation-in-part of application No. 11/028,819, filed on Jan. 4, 2005, now Pat. No. 7,300,695, which is a division of application No. 10/243,111, filed on Sep. 13, 2002, now Pat. No. 6,902,807.

(60) Provisional application No. 60/668,852, filed on Apr. 6, 2005, provisional application No. 60/694,407, filed on Jun. 27, 2005.

(51) Int. Cl.
*B32B 5/16* (2006.01)

(52) U.S. Cl. ........................ 428/403; 359/580

(58) Field of Classification Search ........... 428/403, 428/407; 359/580
See application file for complete search history.

(56) References Cited

U.S. PATENT DOCUMENTS

| | | | |
|---|---|---|---|
| 3,764,067 A | 10/1973 | Coffey et al. | 239/1 |
| 4,310,584 A | 1/1982 | Cooper et al. | 428/212 |
| RE31,780 E | 12/1984 | Cooper et al. | 428/212 |
| 5,059,245 A | 10/1991 | Phillips et al. | 106/31.65 |
| 5,084,351 A | 1/1992 | Philips et al. | 428/411.1 |
| 5,135,812 A | 8/1992 | Phillips et al. | 428/403 |
| 5,214,530 A | 5/1993 | Coombs et al. | 359/359 |
| 5,278,590 A * | 1/1994 | Phillips et al. | 359/589 |
| 5,281,480 A | 1/1994 | Phillips et al. | 428/412 |
| 5,294,657 A | 3/1994 | Melendy et al. | 524/270 |

(Continued)

FOREIGN PATENT DOCUMENTS

EP   1 353 197   10/2003

(Continued)

OTHER PUBLICATIONS

I.M. Boswarva et al, in Proceedings of the 33rd. Annual Society of Vacuum Coaters Technical Conference, held in New Orleans, LA, USA., pp. 103-109 (1990).

*Primary Examiner*—H. (Holly) T Le
(74) *Attorney, Agent, or Firm*—Matthew A. Pequignot; Pequignot + Myers LLC

(57) ABSTRACT

Opaque glitter particles that are uniform in size and shape are disclosed that have an optically variable color with a change in angle of incident light. The glitter particles have an organic substrate and an optical interference structure on one or both sides of the organic substrate. The optical interference design can be a Fabry-Perot structure or can be an optically variable ink.

14 Claims, 20 Drawing Sheets
(2 of 20 Drawing Sheet(s) Filed in Color)

U.S. PATENT DOCUMENTS

| | | | |
|---|---|---|---|
| 5,364,689 A | 11/1994 | Kashiwagi et al. | 428/195.1 |
| 5,383,995 A | 1/1995 | Phillips et al. | 156/230 |
| 5,571,264 A * | 11/1996 | Maruyama et al. | 267/140.14 |
| 6,010,751 A * | 1/2000 | Shaw et al. | 427/255.7 |
| 6,013,370 A * | 1/2000 | Coulter et al. | 428/403 |
| 6,114,018 A | 9/2000 | Phillips et al. | 428/200 |
| 6,235,105 B1 * | 5/2001 | Hubbard et al. | 106/415 |
| 6,243,204 B1 | 6/2001 | Bradley, Jr. et al. | 359/585 |
| 6,475,609 B1 | 11/2002 | Whitney et al. | 428/212 |
| 6,524,381 B1 | 2/2003 | Phillips et al. | 106/417 |
| 6,569,529 B1 | 5/2003 | Phillips et al. | 428/403 |
| 6,695,905 B2 * | 2/2004 | Rozumek et al. | 106/415 |
| 6,744,559 B2 | 6/2004 | Phillips | 359/577 |
| 6,749,777 B2 * | 6/2004 | Argoitia et al. | 252/582 |
| 6,777,085 B1 | 8/2004 | Argoitia et al. | 428/403 |
| 6,815,065 B2 * | 11/2004 | Argoitia et al. | 428/403 |
| 6,838,166 B2 | 1/2005 | Phillips et al. | 428/323 |
| 6,841,238 B2 | 1/2005 | Argoitia et al. | 428/323 |
| 6,902,807 B1 * | 6/2005 | Argoitia et al. | 428/403 |
| 7,300,695 B2 * | 11/2007 | Argoitia et al. | 428/206 |
| 7,330,276 B2 * | 2/2008 | Kawano et al. | 356/517 |
| 7,344,590 B2 * | 3/2008 | Schmidt et al. | 106/415 |

FOREIGN PATENT DOCUMENTS

| | | |
|---|---|---|
| EP | 1 353 197 A2 | 10/2003 |
| EP | 1 741 757 | 1/2007 |
| GB | 2 276 883 A | 10/1994 |
| WO | 2004/024836 | 3/2004 |
| WO | WO 2005/017048 | 2/2005 |

* cited by examiner

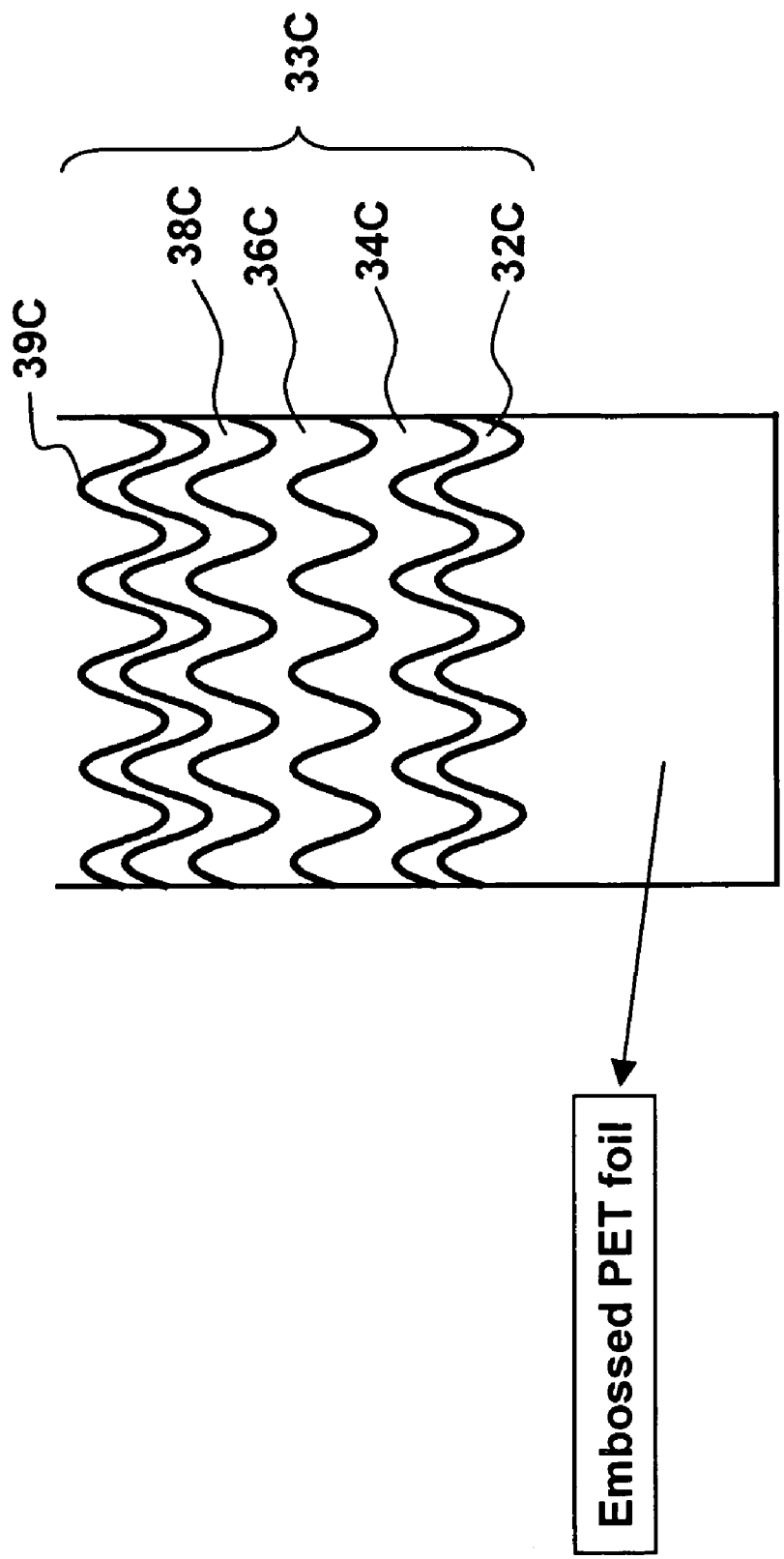

| Batch ID | L* | a* | b* | C* | h | Optical Density |
|---|---|---|---|---|---|---|
| Bl-Rd-Glitter1 | 45.14 | -5.59 | -24.6 | 25.23 | 257.2 | 0.4 |
| Bl-Rd-CF1 | 37.72 | 9.14 | -27.05 | 28.55 | 288.67 | 0.31 |
| Rd-Go_Glitter1 | 40.36 | 10.84 | 0.75 | 10.86 | 3.98 | 0.4 |
| Rd-Go_CF1 | 40.13 | 18.03 | 2.3 | 18.17 | 7.28 | 0.33 |
| Go-Sl_Glitter1 | 59.87 | 7 | 33.25 | 33.98 | 78.12 | 0.37 |
| Go-Sl_CF1 | 60.67 | 5.75 | 36.48 | 36.93 | 81.05 | 0.35 |

Figure 11

HIGH CHROMA OPTICALLY VARIABLE COLOR-SHIFTING GLITTER COMPRISING PARTICLES HAVING INTERFERENCE STRUCTURE COATING

CROSS-REFERENCE TO RELATED APPLICATIONS

The present invention claims priority from U.S. Patent Application No. 60/668,852 filed Apr. 6, 2005 and U.S. Patent Application No. 60/694,407 filed Jun. 27, 2005, which are incorporated herein by reference for all purposes. The present application is a continuation-in-part of U.S. patent application Ser. No. 11/028,819 filed Jan. 4, 2005, now U.S. Pat. No. 7,300,695, which is a divisional application of U.S. patent application Ser. No. 10/243,111, filed on Sep. 13, 2002, now U.S. Pat. No. 6,902,807, which are incorporated herein by reference for all purposes.

FIELD OF THE INVENTION

This invention relates to opaque, optically variable color-shifting glitter particles.

BACKGROUND OF THE INVENTION

Glitter is nearly ubiquitous throughout the world and is used to decorate packaging, clothing, the human body, sporting goods, and many other articles. Glitter, which is a plurality of particles having a regular or irregular periphery, is known in forms that include light reflecting or light refracting material. For example glitter is described in U.S. Pat. No. RE 31,780 (Cooper et al.), U.S. Pat. No. 3,764,067 (Coffey et al.), U.S. Pat. No. 4,310,584 (Cooper et al.), and U.S. Pat. No. 5,294,657 (Melendy et al.).

Materials useful as glitter include particles of metal such as aluminum, copper, silver, gold, brass and particles of transparent or colored, solid organic materials such as poly(ethylene terephthalate), polymethacrylate, and poly(vinylbutyral), and particles of metal coated film or paper (e.g., aluminum coated poly(ethylene terephthalate) film).

Glitter may be clear or may be provided in a variety of colors such as silver, gold, blue, red, etc., or mixtures thereof; and may be provided in a variety of shapes such as circles, squares, rectangles, triangles, diamonds, stars, symbols, alphanumerics (i.e., letters and/or numbers), or mixtures of different shapes.

What is most noticeable about articles coated with glitter is that they tend to glitter or sparkle even when the light source, the coated article and the observer are stationary. Relative movement between the light source, coated article and observer is not required to perceive the glittery appearance of coated articles. Glitter particles each have a large surface area available for reflection, and the glittery effect comes from the misalignment of these particles. However, when relative movement is present, a glitter-coated article tends to sparkle in a dynamic manner wherein the location from where the sparkling effect is viewed, appears to constantly change with movement. Glitter is most noticeable when the glitter particles are opaque; hence, most glitter is formed of an opaque reflective material. Non-opaque glitter particles tend to be faint and washed-out in appearance.

Glitter is commercially available in a variety of colors, shapes and sizes. Since the human eye can barely perceive any glittery effect from reflective particles less than 20 microns in diameter, true glitter particles tend to be larger than 50 microns in diameter. For a pleasing visual effect, it is also preferable for glitter particles to be substantially uniform in shape and size. Having some particles that are too large and significantly larger than other adjacent particles lessens the interesting effect that glitter provides, as the eye tends to focus momentarily on the larger particles distracting the viewer. In contrast, if particles are too small, they simply take up valuable space without providing any perceivable glittery effect.

Metallic appearance of effect pigment has increased rapidly in popularity in the last few years. However, customers are looking for new and exciting visual appearances pushing continuously the research and development of new coatings and applications of paint, inks, gels, etc Continuous work is ongoing to improve the appearance and performance of coatings. As of late, glitter particles having enhanced new features are desired. By way of example, U.S. Pat. No. 6,475,609 in the name of Whitney et al., incorporated herein by reference, describes a glitter that is made of a large number of alternating layers of a two different organic polymeric materials, wherein at least one of the polymeric materials is birefringent. Although the invention described by Whitney et al. appears to function as intended, the structure is non-opaque and does not provide very high chroma or reflectivity. The color shifting that is provided tends to be within a range of two washed-out appearing colors, thus the overall effect is not particularly striking. Neither the glitter affect nor the color shifting effect is particularly good.

Opaque, inorganic based color shifting Fabry-Perot structures have been used for years and have excellent color shifting visual effects. Typically, structures of this type in the form of foils are made by depositing upon a substrate, a reflector layer, followed by a dielectric layer followed by an absorber layer. These foils appear highly reflective from one side due to the presence of a reflector layer and appear highly reflective with a color that changes in an angle dependent manner when viewed from the opposite side due to the Fabry-Perot structure. Flakes for use in paints and inks can be obtained from symmetric Fabry-Perot structures of the type Abs/Diel/Ref/Diel/Abs, where two single Fabry-Perot structures share the same reflector, by stripping off the deposited layers in the form of flakes from the substrate, and subsequently drying the flakes. These color shifting flakes vary in size from about 2 microns to about 20 microns and can be added to a carrier to make inks or paints which exhibit color shifting effects. A great deal of effort has gone into techniques for achieving a relatively high yield of flakes that are substantially uniform in size, generally less than about 20 microns in diameter. Chromaflair™, is a commercially successful product sold by JDS Uniphase Corporation, wherein these small flakes having an average diameter of about 17 microns are dispersed in a carrier to form paint or ink. This paint has gained popularity and is used to coat vehicles, toys, and various other devices and packaging for its highly attractive appeal.

If one looks very closely at an object coated with Chromaflair™, a glittery appearance can only be faintly discerned and is only barely perceptible. In fact, without straining one's eyes purposefully looking for a glitter effect, it is likely that no glitter effect would be noticed. On the contrary, a strong metallic effect is observed; the predominant effect is the color shifting from the opaque flakes within the carrier. Due to the particle size of flakes used in Chromaflair™ the observer sees a slight iridescence rather than a glitter. Samples of Chromaflair™ may currently be found for viewing on the internet at www.jdsu.com.

In order for these paints and inks to appear truly "glittery" the particles would have to be of a diameter similar to conventional glitter; that is, greater than about 30 microns or more and preferably more than 50 microns and up to or greater than 2000 microns.

As was described heretofore, conventional optically variable (OV) flakes used to make inks and paints are obtained by scraping a foil that has been coated with a symmetric multi-layer opaque color shifting film. Prior to scraping, the foil is typically placed in a chemical bath, for example in acetone, so as to loosen the deposited layers from the substrate. During the scraping process the flakes tend to break apart from their carrier substrate in pieces having a large distribution in particle size. Some flakes may have an equivalent diameter of about 1-5 microns while others may have an equivalent diameter of up to 125 microns. Although the large particles are desirous for use as glitter, the size in which particles break cannot be accurately controlled and tend to be too small on average. Furthermore, particles having large diameters tend to curl, losing their ability to serve as high quality glitter which needs to be relatively flat.

In summary it is preferred to have glitter particles which are substantially flat, uniform in size and shape, and which are opaque.

It is also desirous to have glitter particles which are at least 30 microns in size, and which have excellent color shifting qualities and high chroma as well as high reflectivity.

The applicant has found that by using conventional techniques used to make color shifting pigments used in paints or inks, high quality glitter cannot be made as the particle distribution, size and flatness required for glitter cannot be met.

It is therefore an object of this invention to provide glitter which has high chroma, is opaque, and which can be manufactured in a desired shape with a very even size distribution, and wherein the particles are large enough and flat enough to be recognized as glitter.

It is also an object of this invention, to provide a glitter which both provides a strong glitter effect when the object is stationary, and which provides a high degree of chroma and strong color shifting effects when the object or light source upon the object is moved.

It is an object of this invention to provide color shifting glitter particles that have an average size that meets the requirement of glitter, and wherein the particles are substantially flat.

In accordance with this invention, an opaque color-shifting glitter is provided, wherein a structure is provided comprising an organic support layer and; a) a single or double period Fabry-Perot structure on each side of the organic support layer, or, b) two single or a double period Fabry-Perot structure sharing the same reflector layer on one side of an organic support layer or c) an optically variable color shift ink on one side of an organic support layer.

In accordance with this invention these glitter particles preferably each have a diameter "d" of at least 30 microns, and a thickness "t" of more than 6 microns wherein t<d/2. The organic support layer provides rigidity for preventing the color shift coating from curling, for allowing precise cutting of the glitter substrate into discreet particle size and or lessening chipping and breaking of the interference coatings.

In an alternative embodiment, the opaque color shifting glitter is embossed with a diffractive microstructure providing a glitter that shows opaque color shifting by thin film and diffractive light interference simultaneously. This combined interference is disclosed in U.S. Pat. No. 6,841,238 related to chromatic pigments and foils.

An alternative embodiment that is within the scope of this invention is to put one of the above mentioned structures (a), (b) or (c) onto pre-sized substrates that all have the same size i.e. glass flake, mica, boron nitride, aluminum oxide that conform to the above dimensions. This process is disclosed in U.S. Pat. Nos. 6,524,381 and 6,777,085 patent, related to coating particles.

In accordance with an aspect of this invention, an opaque color-shifting glitter is provided, comprising a plurality of glitter particles, wherein the glitter particles each comprise an organic support layer carrying on each side thereof, a reflector layer, a dielectric layer and an absorber layer, said particles each having an diameter "d" of at least 30 microns, and a thickness "t" of more than 6 microns wherein t<d/2, the organic support layer providing rigidity for preventing the particles from curling and for lessening chipping and breaking of the particles.

In accordance with this invention an opaque color shifting glitter is provided comprising glitter particles that have been produced by mechanical means or by a laser inscribing tool such that their shape and size is substantially uniform, said glitter particles each comprising an inorganic thin film optical interference structure providing a perceivable color shift with a change in viewing angle or angle of incident light, in the visible spectrum, wherein said inorganic thin film interference structure of each particle is supported by an organic support layer for providing rigidity and for preventing the particles from curling.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments of the invention will now be described in conjunction with the drawings.

FIG. 3c shows a glitter particle of this invention with two single Fabry-Perot structures on the diffractive side of a transparent organic support layer where the two Fabry-Perot structures share a common reflector layer.

FIG. 11 is a table of data with color properties of different "Chromaflair™" and color shifting glitter obtained with a DataColor SF600+ spectrophotometer

DETAILED DESCRIPTION

Figure 1:
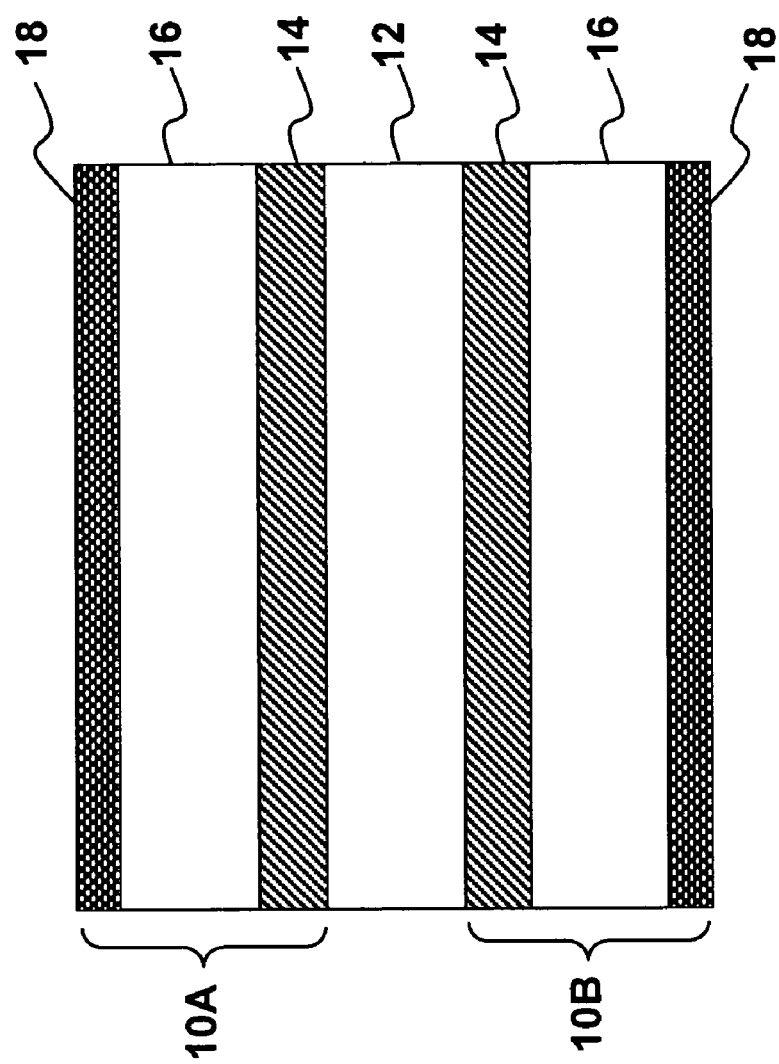
FIG. 1 shows a glitter particle of this invention with an un-symmetrical single period Fabry-Perot filter on both sides of an organic support layer.

Turning now to FIG. 1 a glitter particle is shown which has been mechanically cut to a predetermined size and shape such that the diameter is at least 50 microns across and preferably 150 microns or larger. The particle is comprised of two single-period Fabry-Perot structures 10a and 10b deposited on opposite sides of an organic support layer 12 which may be transparent or opaque. The single-period Fabry-Perot structures 10a and 10b each have a reflective layer 14, a dielectric layer 16 and an absorber layer 18 deposited upon the organic substrate 12 which is considerably thicker than each of the layers 14, 16, or 18 deposited thereon. The embodiments exemplified in the structures shown in FIGS. 1 through 4, and FIGS. 6 and 7 can be made in a vacuum roll coater using a flexible transparent or opaque sheet of organic material. Transparency or opaqueness of the substrate depends on whether viewing through the supporting substrate is required to see the optically variable coating. Typically, 1 mil polyester is used as a support substrate 12; however, other organic webs and other thicknesses can be used. Organic webs can include polyethylene terephthalate, polyethylene, oriented polypropylene, polycarbonate, polyvinylbutyral, polyhexadiene, and polyimide. Alternatively, webs that do not require transparency may be used however the web should be able to be cut into glitter. The thickness of the web or substrate may range from 0.5 mil to 3 mil.

Vacuum roll coating techniques are well known, and in particular, optically variable thin film production in a vacuum roll coater is also known. I. M. Boswarva et al, in Proceedings of the 33rd. Annual Society of Vacuum Coaters Technical Conference, held in New Orleans, La. USA., p. 103-109 (1990), incorporated herein by reference, describes the making of optically variable coatings based on an all dielectric design, on plastic webs. Coatings were made of ZrO2 and SiO2 layers deposited onto a release coated carrier web and then removed by a UV cure adhesive to form optically variable patches on Canadian bank notes. These patches were about one half inch square.

The use of release coated substrates in a vacuum roll coater to make optically variable pigment (OVP) is also well known and the following US patents are incorporated by reference; U.S. Pat. Nos. 5,383,995, 5,281,480, 5,059,245, 5,084,351, 5,214,530, 6,243,204, 6,569,529, 6,744,559 and 5,135,812. Materials and coating designs described in the aforementioned patents are also included as references for the types of materials that could be used in this invention.

In contrast to Boswarva, this invention does not utilize a release coated substrate as the thin film optical stack, nor is a transparent all dielectric design utilized. In contrast to the aforementioned US patents this invention does not require using a release coated substrate and does not remove the coating from the web to make pigment (ie. flakes). Furthermore, the glitter particles in accordance with this invention preferably all have the same dimensions in contrast to a Gaussian distribution of pigment particles in the prior art that are generally centered about 17 microns. In a preferred embodiment the glitter particles are relatively large in comparison that is to say, they are about 100 microns or more.

From a viewing perspective, the optically variable pigment looks totally different to the optically variable glitter particles. The color of the optically variable pigment alone or when incorporated into an ink or paint is uniform in color at a given angle. In contrast, the optically variable glitter particles sparkle as individual points of color when incorporated into an ink or paint. In both cases, there is a color shift with viewing angle.

Figure 8:
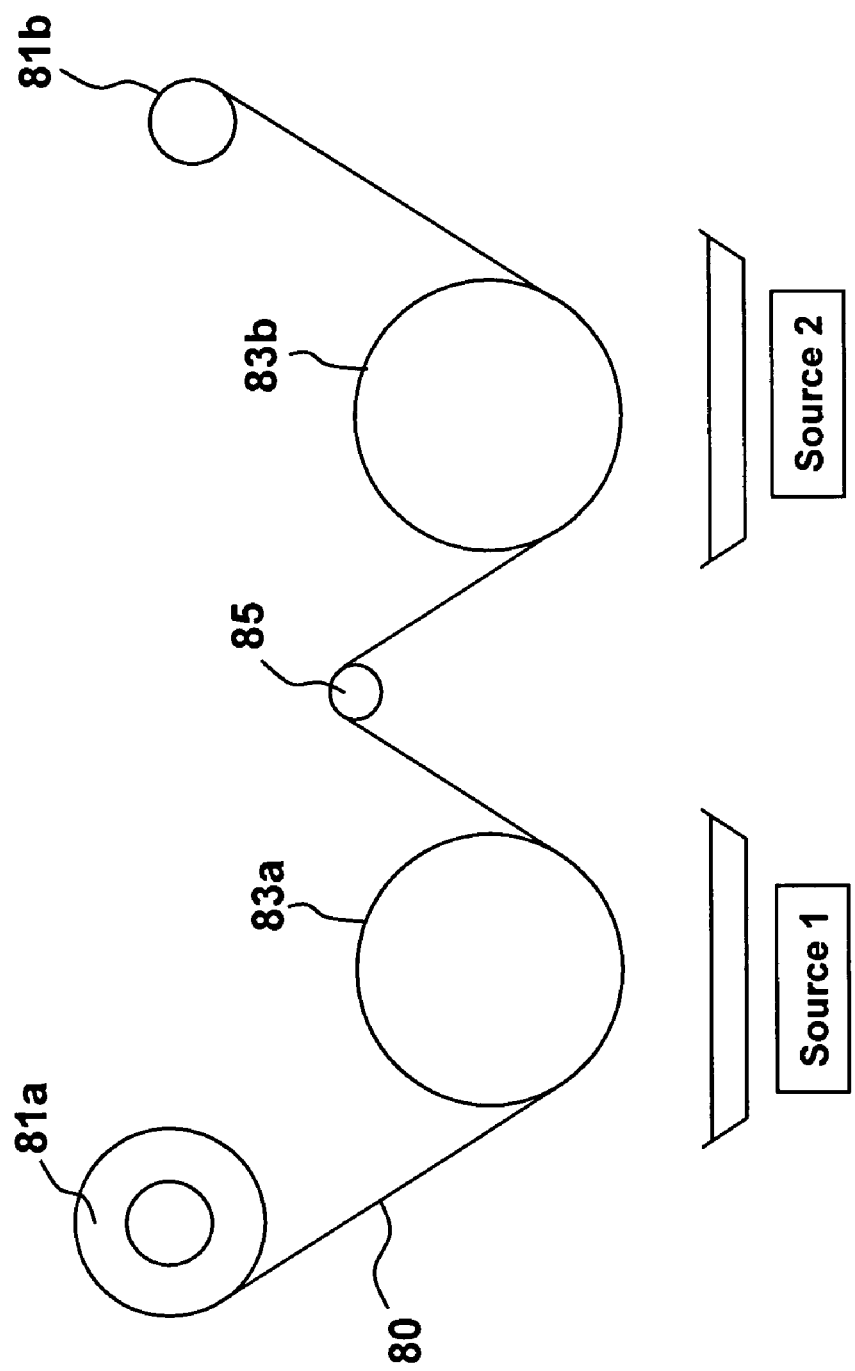
FIG. 8 is a diagram illustrating a two drum vacuum roll coater schematic that shows coating sources under each cooled drum.

Weight concentration of metals and dielectrics in a glitter is lower that in pigments. This makes glitter more interesting to the cosmetic industry In a preferred embodiment a roll-to-roll a double deposition system can be employed as shown in FIG. 8 wherein simultaneous deposition of the absorber, dielectric and reflector layers can be achieved.

By forming a sheet that has the structures shown in FIGS. 1-7, the sheet material can be cut into particles without the need for solvent stripping with its associated environmental and required personal protection impact normally associated with the conventional harvesting of flakes from Fabry-Perot coated release type polyester film. Here one simply removes the roll from the coating chamber and cuts the web into glitter particles by using well known confetti type cutting machines. Various shapes can be cut including, squares, rectangles, triangles and hexagons.

Applications for this optically variable glitter include paints where such glitter effects are desired i.e. on boats, skis, snow boards, personal watercraft. Such glitter particles can also be used in plastics such as hair combs, toys and appliances.

Figure 2:
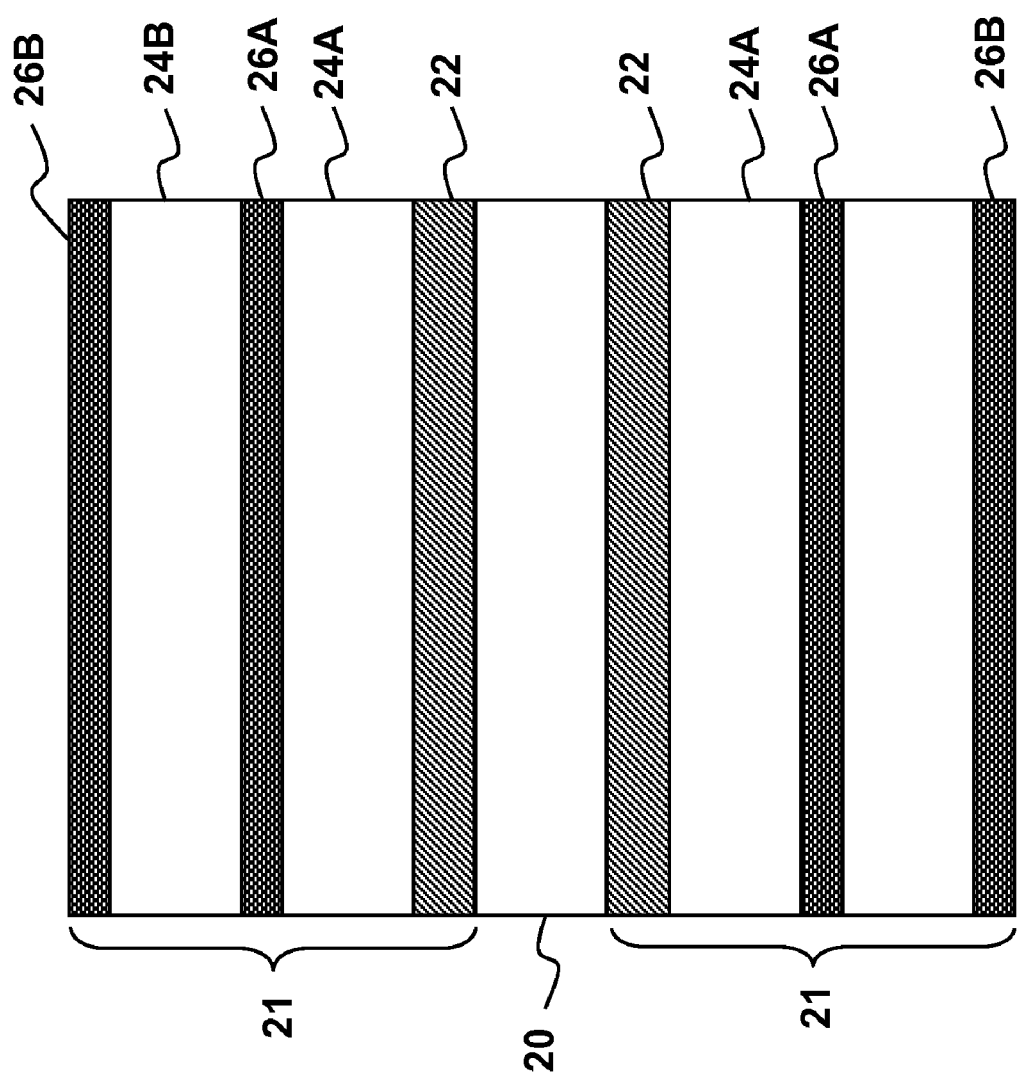
FIG. 2 shows a glitter particle of this invention with an un-symmetrical double period Fabry-Perot filter on both sides on an organic support layer.

Turning now to FIG. 2 a glitter particle is shown with two double period Fabry-Perot structures 21 each side of a central organic support layer 20 which may be transparent or opaque. Each Fabry-Perot structure consists of a reflector 22, dielectric spacers 24a and 24b, and two absorber layers 26a and 26b. FIG. 2 and FIG. 1 are quite different in that the double cavity makes colors that are not possible with a single cavity.

There is peak suppression in the spectra for a double cavity allowing higher chroma in structures shown in 2 than those in FIG. 1.

Figure 3:
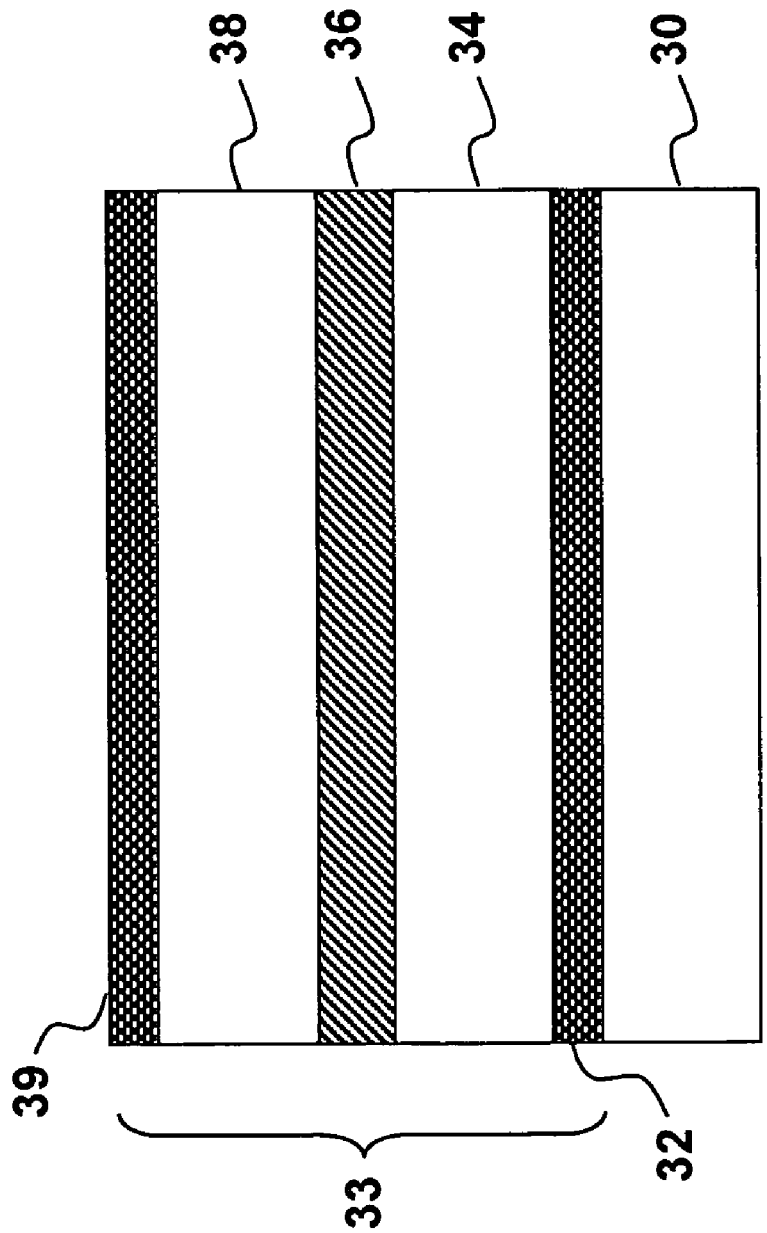
FIG. 3 shows a glitter particle of this invention with two single Fabry Perot structures on the one side of a transparent organic support layer where the two Fabry Perot structures share a common reflector layer.
Figure 3B:
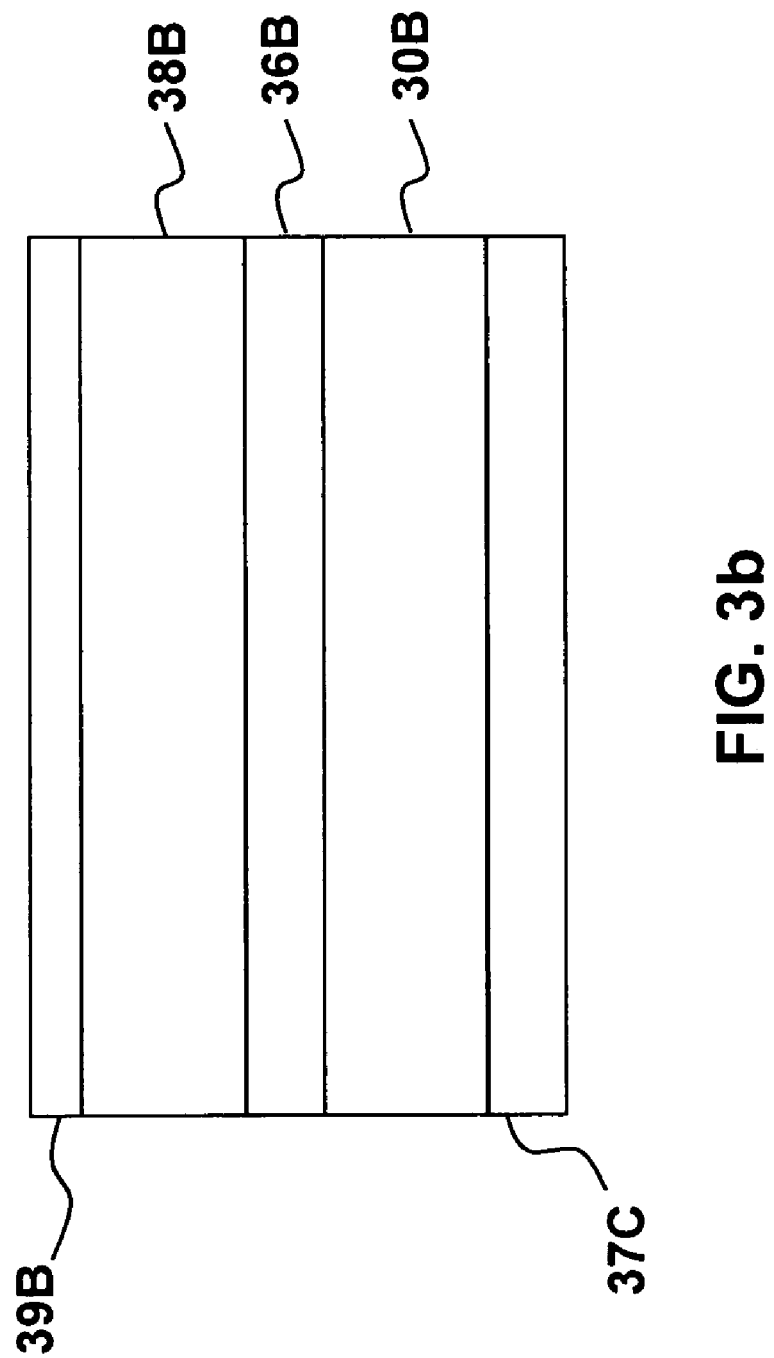
FIG. 3b shows a glitter particle of this invention with a single unsymmetrical Fabry Perot filter on one side of a transparent organic support layer and a reflector of the second side of the support layer.

An alternative embodiment is shown in FIG. 3 wherein a glitter particle is shown with two single Fabry-Perot structures 33 sharing the same reflector on one side of a transparent organic support layer 30. An absorber layer 32 is deposited upon the substrate and a dielectric spacer layer 34, reflector layer 36 dielectric spacer layer 38 and absorber 39 are deposited upon one another over layer 32. This asymmetrical glitter particle is optically variable when viewed from either side of a transparent support layer but in the case of an opaque support layer one would see an optically variable effect with reduced brightness. In the latter case, some particles would be oriented with the opaque side to the viewer whereas other particles would be oriented with the optically variable coating to the observer Referring to FIG. 3b, a glitter particle is shown wherein an organic support layer 30b has a reflector coating 37c on a bottom surface and a Fabry Perot structure with an absorber layer 39b a dielectric layer 38b and a reflector layer 36b on an upper surface.

Referring to FIG. 3c, a glitter particle is shown with two single Fabry-Perot structures on the diffractive side of a transparent organic support layer where the two Fabry-Perot structures share a common reflector layer. The transparent organic substrate has a diffraction grating impressed therein, and the subsequent inorganic thin film layers deposited thereon, take the form of the grating yielding a structure which has diffractive effects as well as color shifting thin film effects due to the absorber, dielectric and reflector layers. The symmetry of the deposited thin film layers about the central reflector layer provide thin optically variable effects when viewed from both sides if the a transparent organic substrate is provided. The tendency of such a large diameter diffractive flake to curl, or break during cutting is lessened considerably by having the thick stable organic layer as a support for the absorber, dielectric and reflector layers. When the two single Fabry-Perot structures are located on the non diffractive side of the support layer, the glitter particles will show a combination of diffraction and thin film interference when seen from the grating side and only thin film interference when seen from the flat side. A product coated with this variation of glitter will show a combination of these effects since statically a glitter particle will land 50% of the time on the flat side and 50% on the diffractive side.

Figure 4:
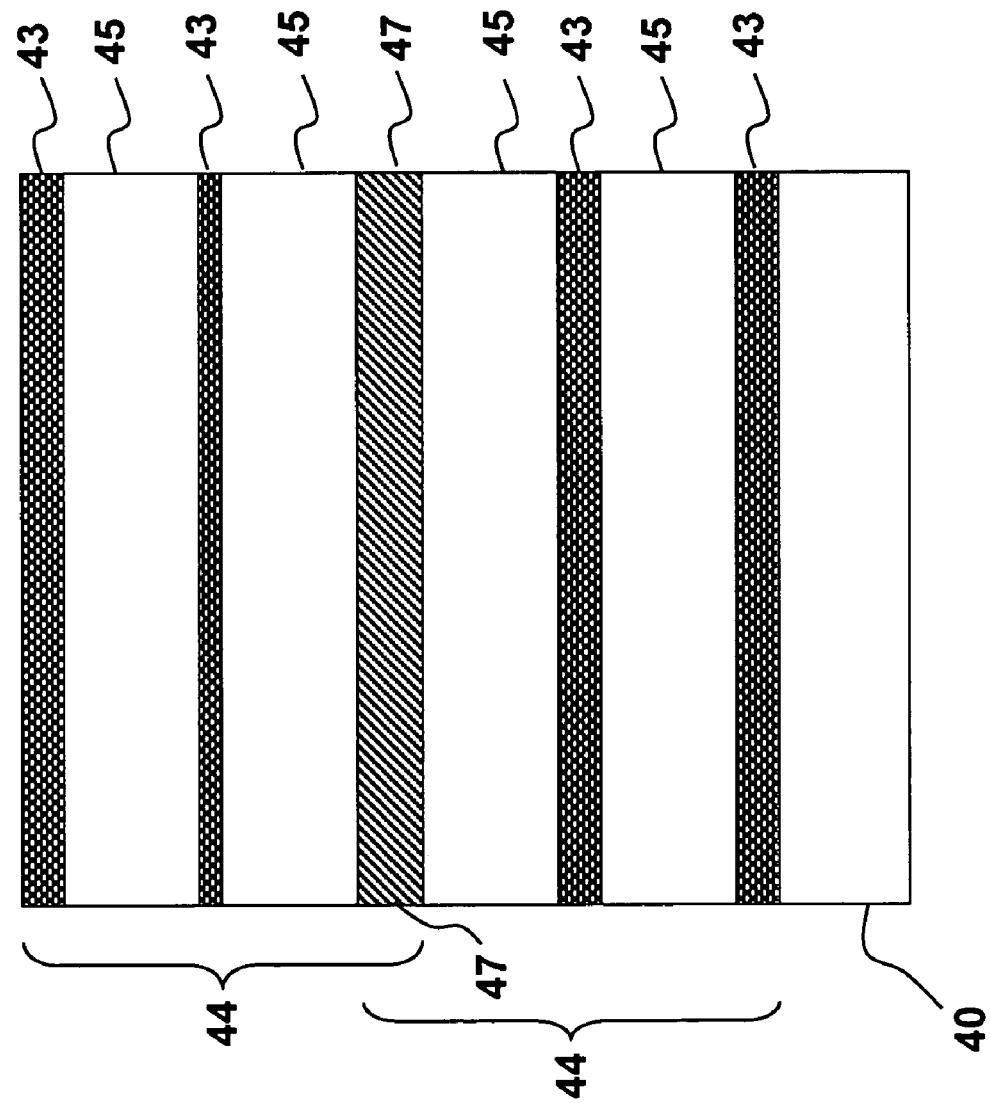
FIG. 4 shows a glitter particle of this invention with two double period Fabry-Perot structures on one side of a transparent organic support layer. The two double period Fabry-Perot structures share a common reflector layer.
Figure 5:
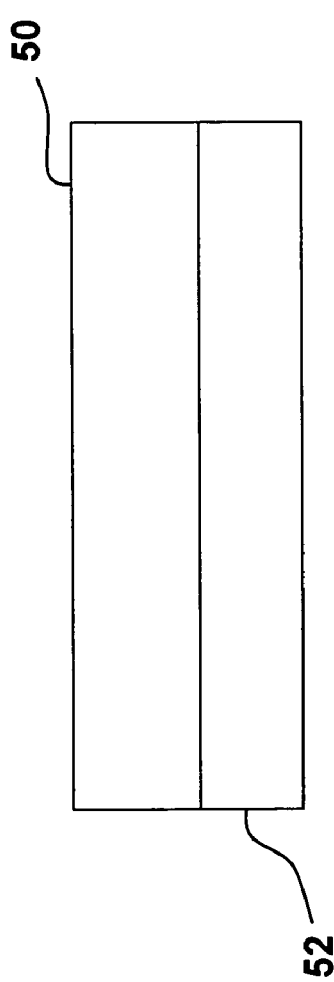
FIG. 5 shows a glitter particle of this invention with a color shifting ink on one side of an organic support layer.

FIG. 4 is an embodiment bearing two double Fabry-Perot filters 44 disposed upon a transparent organic support layer 40. Each of the double Fabry-Perot structures 44 have two absorber layers 43, two dielectric spacers 45, and share a reflector layer 47, centrally disposed between the double Fabry-Perot structures 44. The advantage of this embodiment over the embodiment depicted by FIG. 2 is that it is easier to manufacture since only one side has to be coated. In FIG. 2, using conventional coating machines, the roll has to be removed from the vacuum coating chamber to coat the other side. Clearly, it is more economical to coat just one side.

An alternative embodiment of this invention is shown which is departure from the embodiments shown in FIGS. 1 through 4 described above. The glitter particle shown in FIG. 5 consists of an organic support layer 50 having a color shifting ink or paint 52 on one side of the support layer. By providing a transparent layer 50 the color shifting ink or paint can be seen from both sides. Although this embodiment is color shifting with a change in viewing angle or change in direction of the light source, it is less reflective as a glitter particle than the afore-described embodiments which have a uniform flat reflecting layer.

Figure 6:
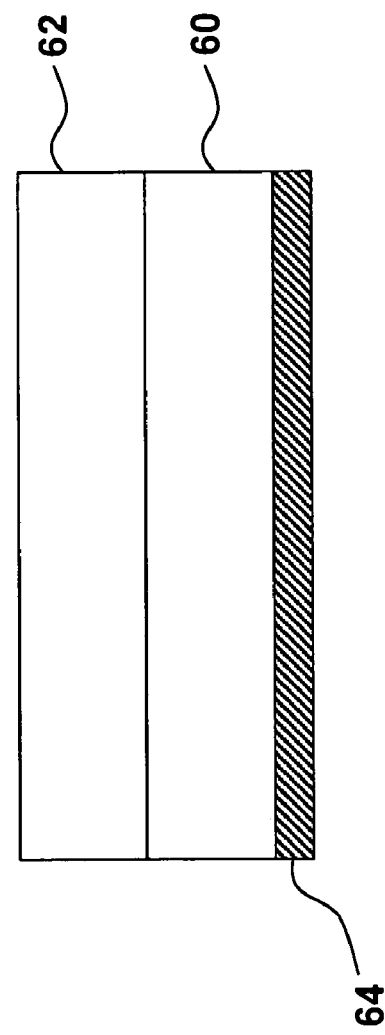
FIG. 6 shows a combination glitter particle of this invention wherein a reflector is on one side of the support layer and on the other side is an interference coating as depicted in FIGS. 1-5.

In FIG. 6 a depiction of an embodiment of the invention is shown wherein an organic support layer 60 supports one of the coatings 62 described in the previous embodiments. The other side of the organic support layer 60 is coated with a reflective coating 64. This particle is highly reflective when viewed from the side with the reflective coating 64 and has optical variable properties when viewed from the other side having the coating 62.

Figure 7:
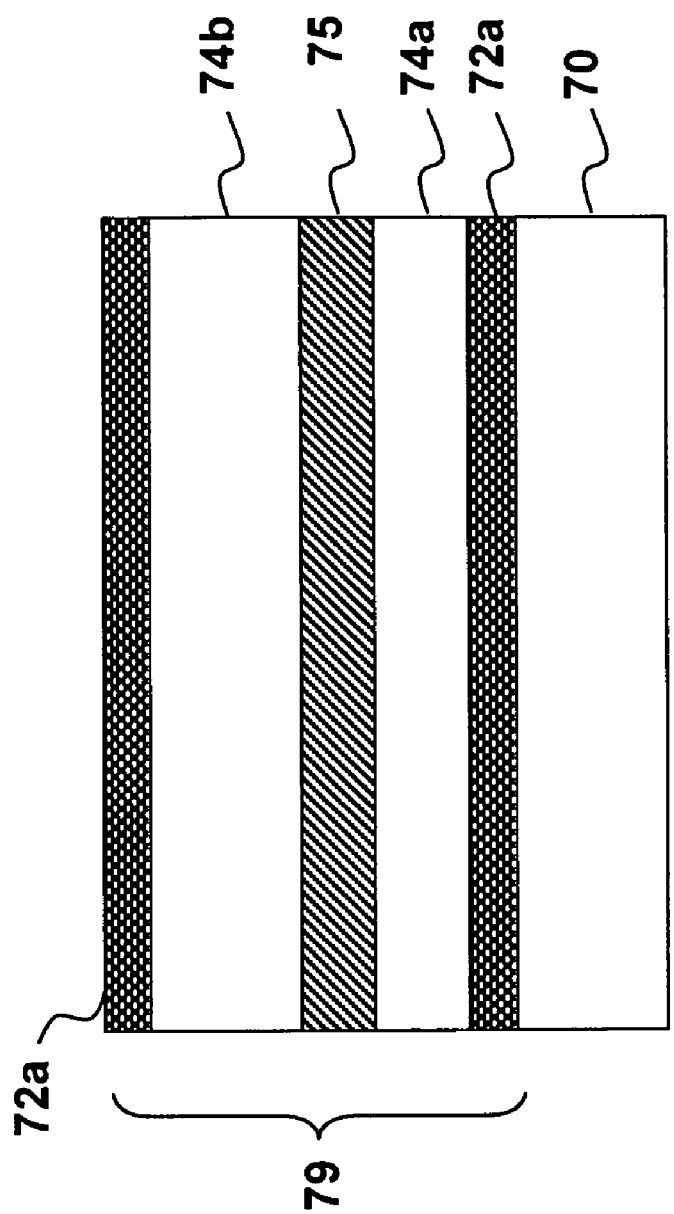
FIG. 7 shows a glitter particle of this invention with two single period Fabry-Perot structures sharing the same reflector layer on one side of a transparent organic support layer wherein the thicknesses of the dielectric layers are substantially different.

FIG. 7 shows a glitter particle of this invention with two single-period Fabry-Perot structures 79 sharing the same reflector layer on one side of a transparent organic support layer 70. The double structure includes a transparent organic support layer which supports absorber layer 72a, a dielectric spacer layer 74a, a reflector layer 75, a dielectric spacer layer 74b and an outer absorber layer 72a. It should be noted that the thickness of the dielectric layer 74a is different from the dielectric layer 74b. With a suitable combination of dielectric thickness, the glitter particles can have the same color at one angle and two different colors when shifted to a different angle; (Metamerism by thin film interference). Because of the size of the glitter particles, these two colors will be easily differentiated between glitter particles sparkling as individual point of colors. This asymmetrical concept can be applied to the configurations corresponding to FIGS. 1 to 4.

In a preferred embodiment a roll-to-roll a double deposition system is employed as shown in FIG. 8. An un-wind reel 81 a feeds organic sheet material 80 which passes under drums 83a and 83b to a wind-up reel 81b via a tension wheel 85, wherein simultaneous deposition of the absorber, dielectric and reflector layers can be achieved. By way of example, Source 1, may be a multi-pocket evaporation crucible that holds more than one material and the type of evaporation at Source 1 and Source 2 may be either resistive, electron beam or DC magnetron sputtering, Thus, this invention provides optically variable highly reflective glitter which has both excellent performance as color shifting particles and which simultaneously, functions as highly reflective glitter.

EXAMPLE 1

A comparison study between optically variable flakes and color shifting glitter particles:

Samples were prepared as painted draw-downs as follows:

Gold to Silver (GO-SL), Blue to Red (BL-RD) and Red to Gold (RD-GO) optical variable thin film coatings were prepared as optically variable flake and optically variable glitter. The designs were of the Fabry-Perot type having the structure: Cr/MgF2/Al/MgF2/Cr. The spacer layer thickness was adjusted to obtain the correct color shift as per the known structures in the aforementioned patents.

Figure 9B:
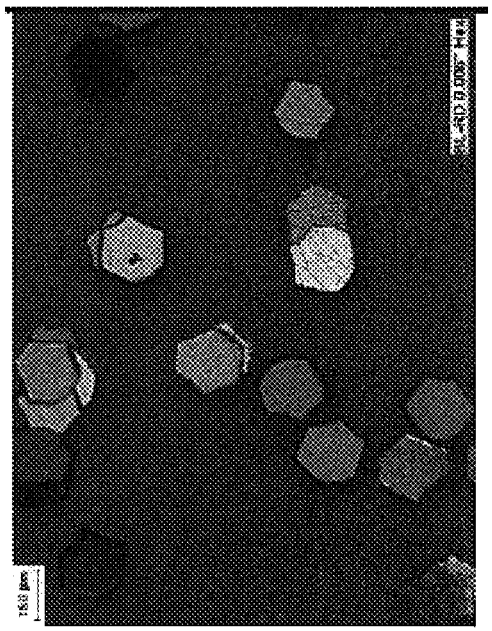
FIGS. 9a, 9b and 9c show three optical micrographs illustrating hexagonally cut glitter particles with different color shifting designs on a 1 mil PET foil substrate.
Figure 9C:
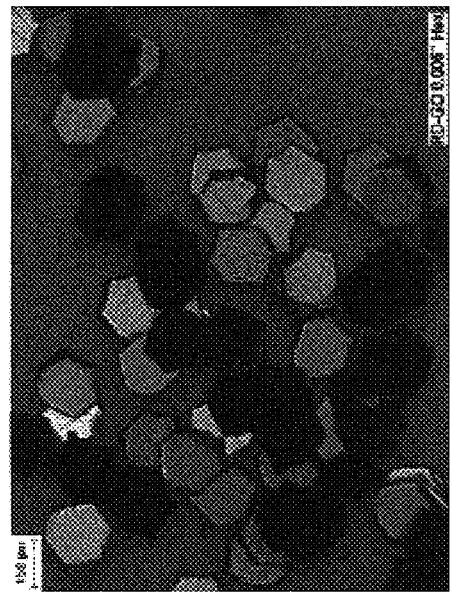
Figure 9A:
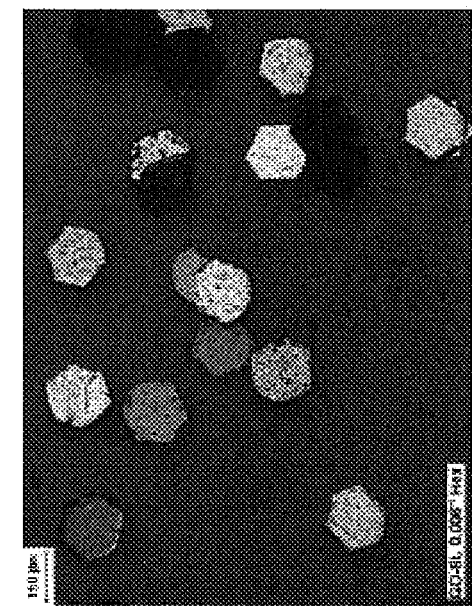

The glitter samples in the micrographs shown in FIGS. 9a, 9b and 9c and each have a 1 mil thick polyester foil attached to an inorganic optical multilayer stack. In the prior art the optically variable flake is absent the organic polyester film. The optically variable flake samples have 50% of particles larger than 20 microns and 50% smaller than 20 microns, with 99.9% of particles larger than 4 microns and 0.01% of particles smaller than 80 microns. The lateral to thickness ratio thus corresponds to an aspect ratio between 4 and 80. In contrast, the glitter samples were cut to 0.006" (150 microns) in a hexagonal shape, corresponding to an aspect ratio of about 6 counting for more than 98% of the glitter particles.

Paint Formulation:

Considering a density of polyester of about 1.4 gm/cc, and average of 3 gm/cc for Al and MgF2, paint was prepared for both the optically variable flake and for the optically variable glitter. The paint was prepared at 3 particles to binder (ptb) on a weight base for the optically variable flakes and at 25 ptb for the glitter particles to compensate for thickness and get similar "hiding" preventing seeing through the ink so that the substrate is visible.

Figure 10:
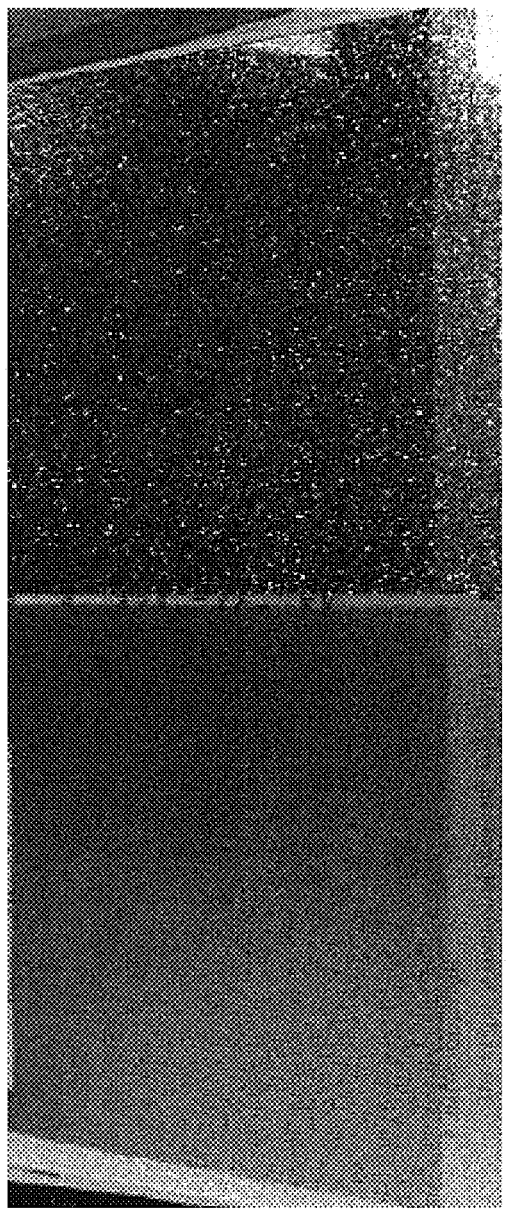
FIG. 10 shows photographs of color shifting "Chromaflair™" on the left and color shifting glitter on the right side shifted to a high angle and also at an angle near normal.
Figure 10:
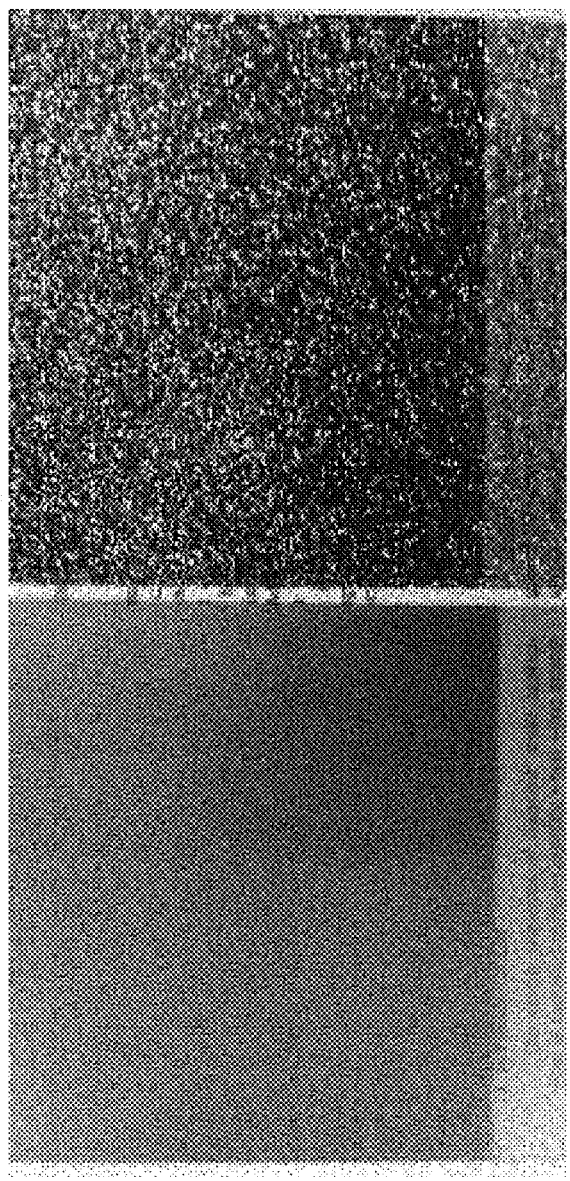

For both particle types the paint was applied on nine consecutives passes at 90 degrees orientation one to each other over a transparent card. Following, the painting with the glitter or optically variable flake, half of the coating was over coated with black paint so that optical properties at normal and different angles of incidence and viewing could be measured. FIG. 10 shows the GO-SL optically variable flake and glitter samples at different angles. As one can see, visually the two products have very different optical effects.

Figure 12:
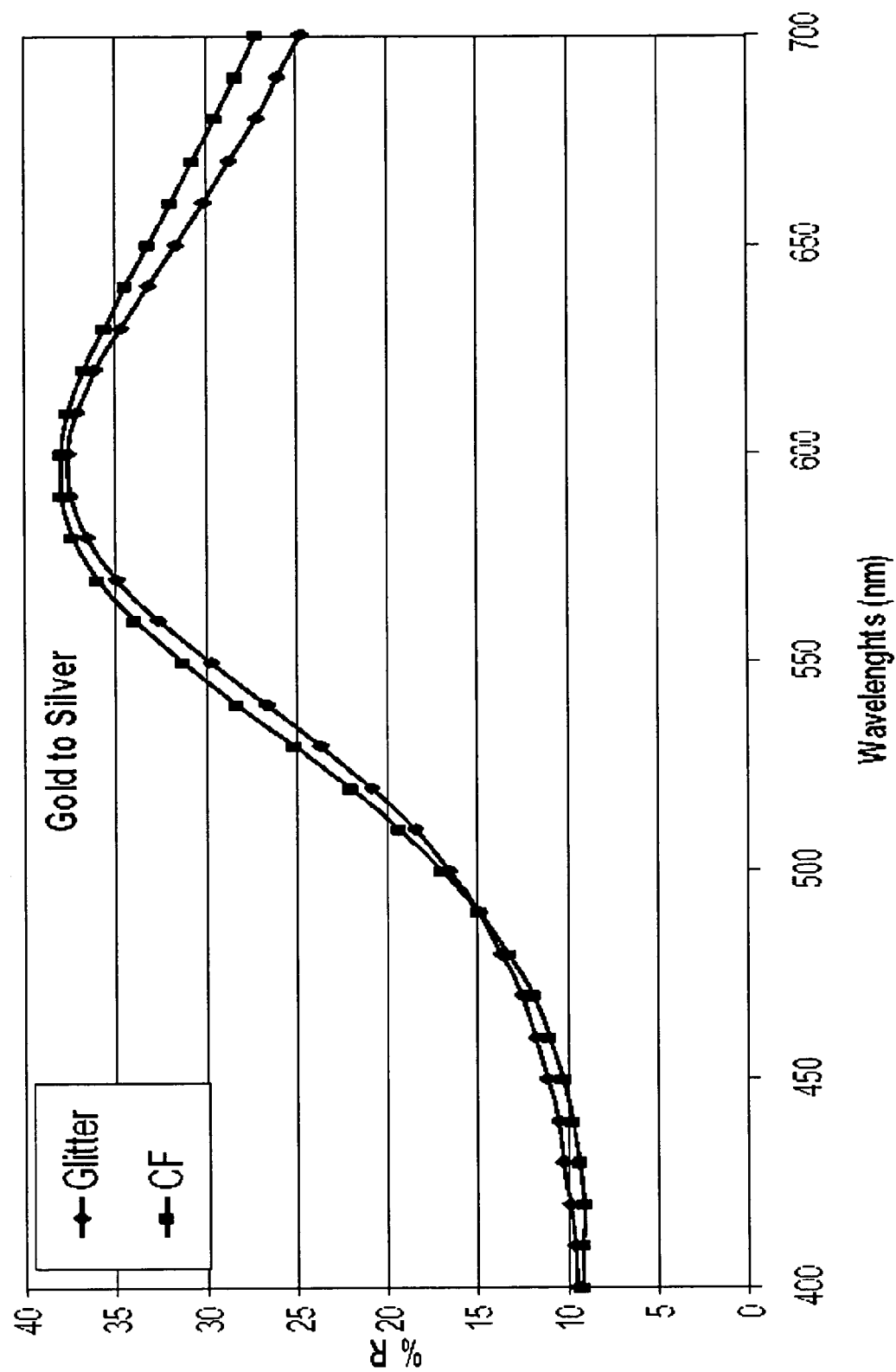
FIGS. 12, 13, and 14 are graphs depicting reflectance versus wavelength spectra for different material designs for color shifting glitter and color shifting flakes.
Figure 13:
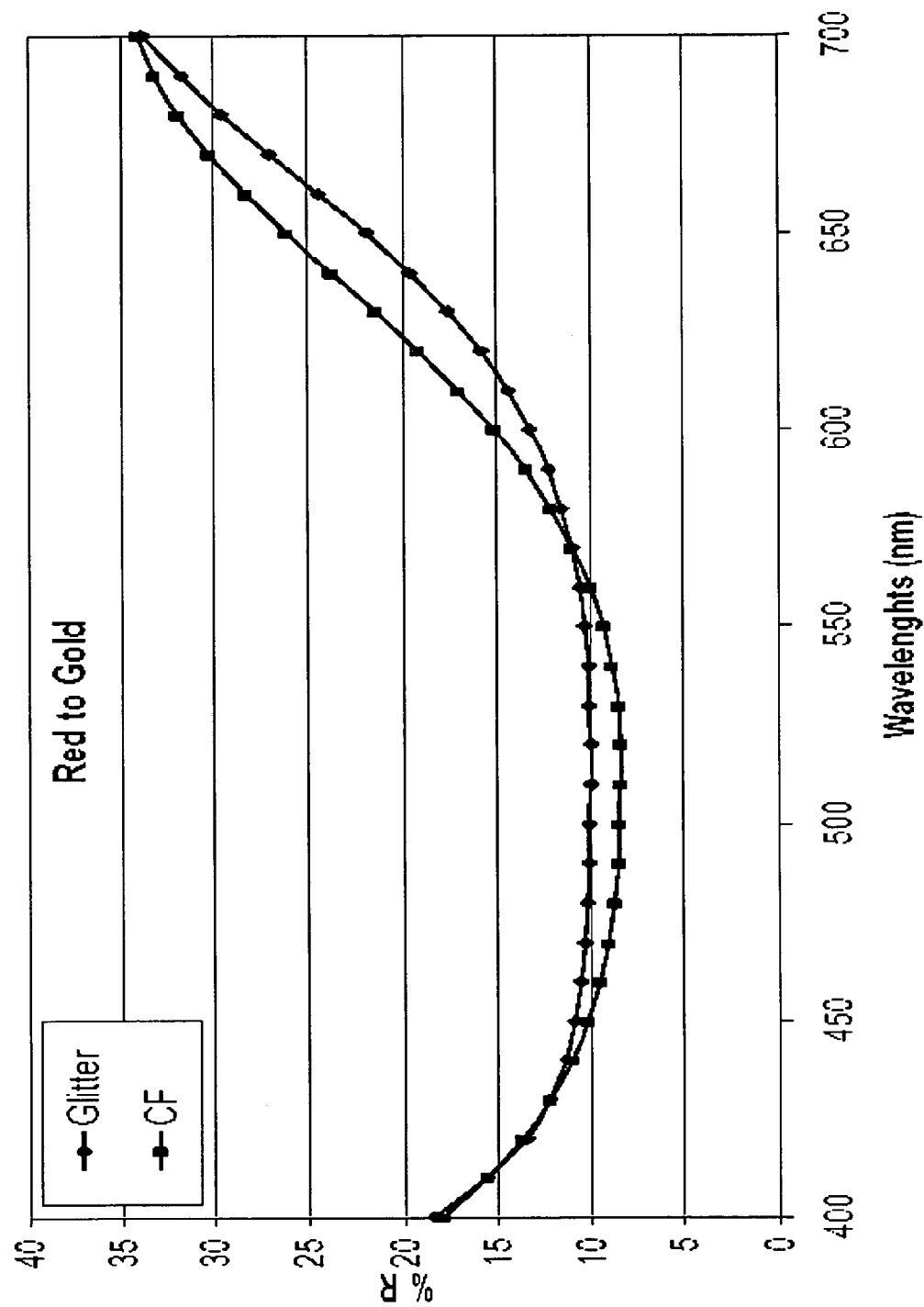
Figure 14:
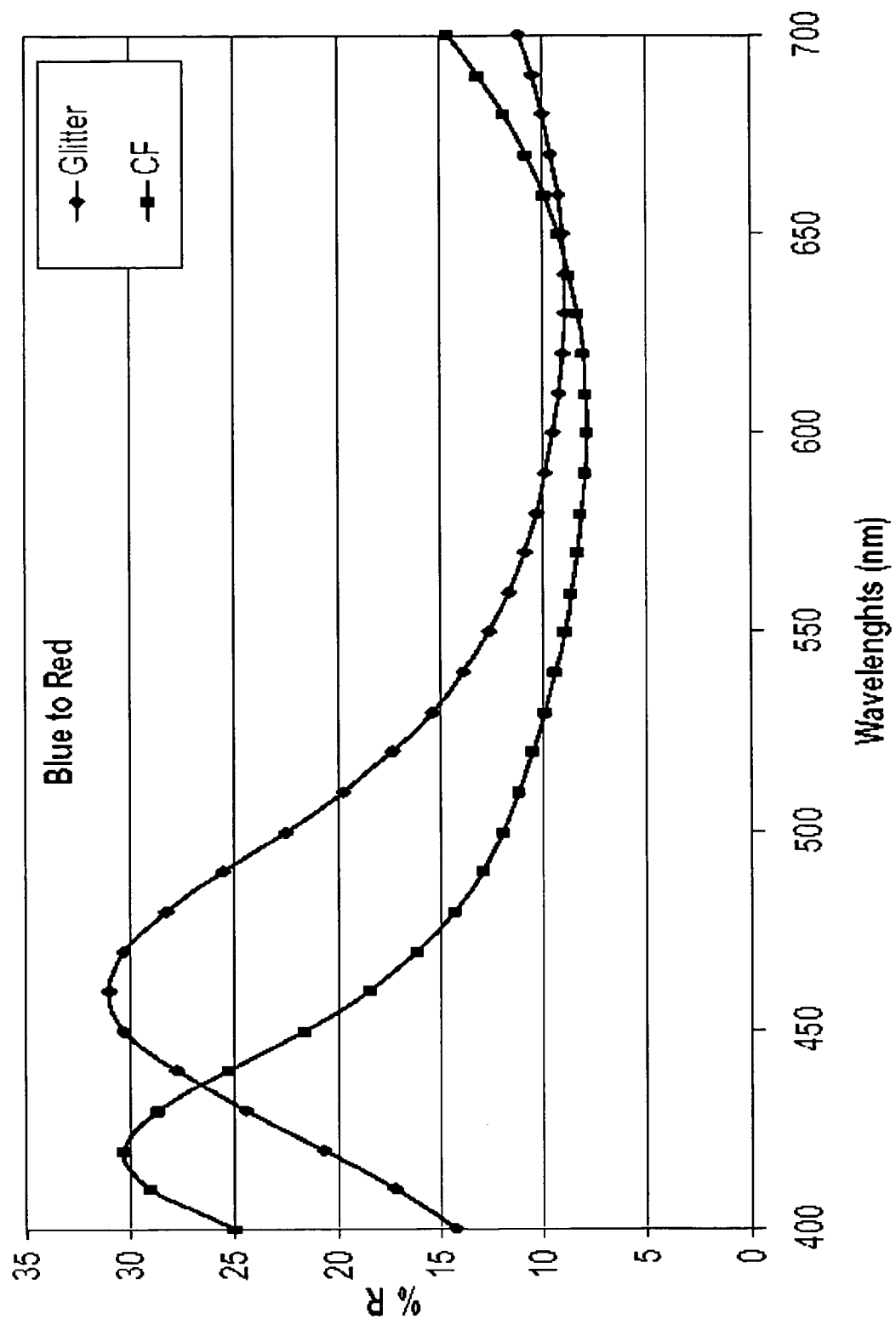

Results of the Optical Characterization:

Method 1: Diffuse Illumination: Integrated Reflection:

Under diffuse illumination, the color performance was characterized using a DataColor SF600+ spectrophotometer. This instrument uses an integrating sphere to yield a diffuse/8 degree illumination/viewing geometry with specular included. The data is presented in 1976 CIELab color space in the table of FIG. 11. This table also shows the optical density of the samples measured on the side that was non-over coated with the black paint. This shows that the 3 and 25 ptb paint formulation produces a close optical density for similar spraying conditions. Therefore, the particle density in both samples as respect to optically variable flake and the glitter particles are similar. FIGS. 12, 13, and 14 show reflectance versus wavelength spectra to compare each one of the color shifting designs.

In general, based on the SF600 results, the paint containing glitter particles versus optically variable flake samples have similar optical characteristics. In particular, the gold to silver comparison is striking since the properties are essentially identical. This supports the notion that even though the light appears different to the eye, the total amount of reflected light from each sample surface is the same.

Method 2: Off Gloss Measurements:

Viewing angle is 10 degrees from angle of specular reflection, characterizing optically variable flake and glitter particles for the gold-to-silver color shift by off-gloss measurements.

Figure 15:
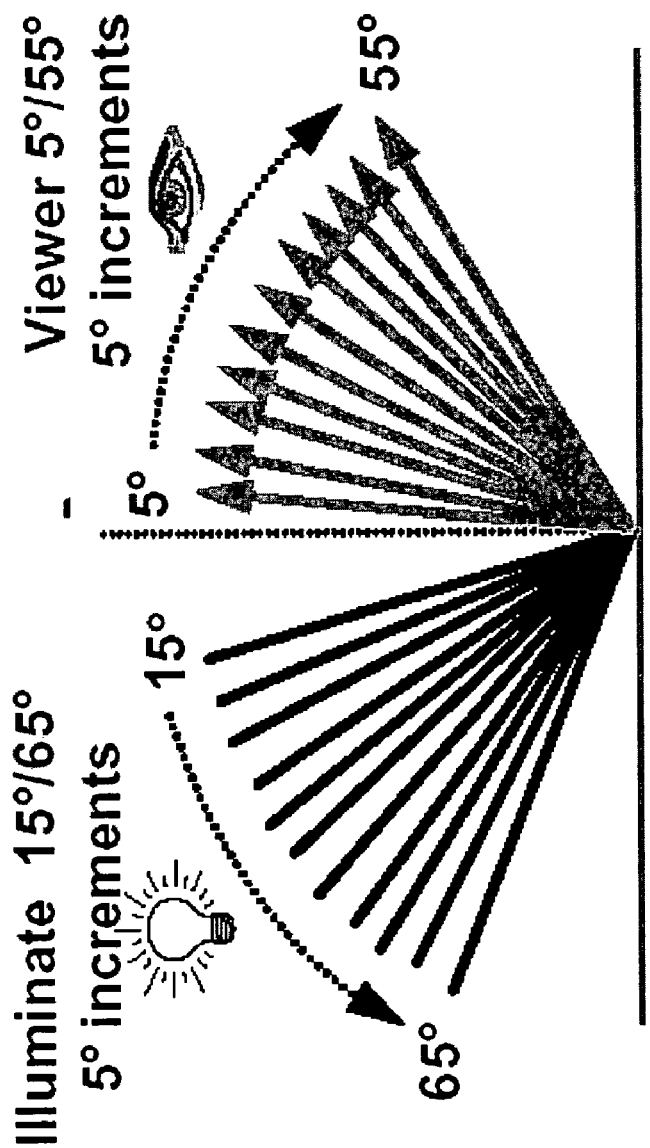
FIG. 15 illustrates a geometry used to characterize the color shifting properties of the particles near to the specular reflection at increasing angles of incidence and viewing, wherein the illumination and viewing angles are 10 degrees off from the specular to avoid the strong gloss component associated with clear-coated samples, wherein the samples were characterized using 11 angles of illumination/viewing from (15°/5°) to (65°/55°) in 5° increments.

A geometry was used to characterize the color shifting properties of the particles near to the specular reflection at increasing angles of incidence and viewing. In this geometry shown in FIG. 15, the illumination and viewing angles are 10 degrees off from the specular to avoid the strong gloss component associated with clear-coated samples. The samples were characterized using 11 angles of illumination/viewing from (15°/5°) to (65°/55°) in 5° increments.

Figure 16:
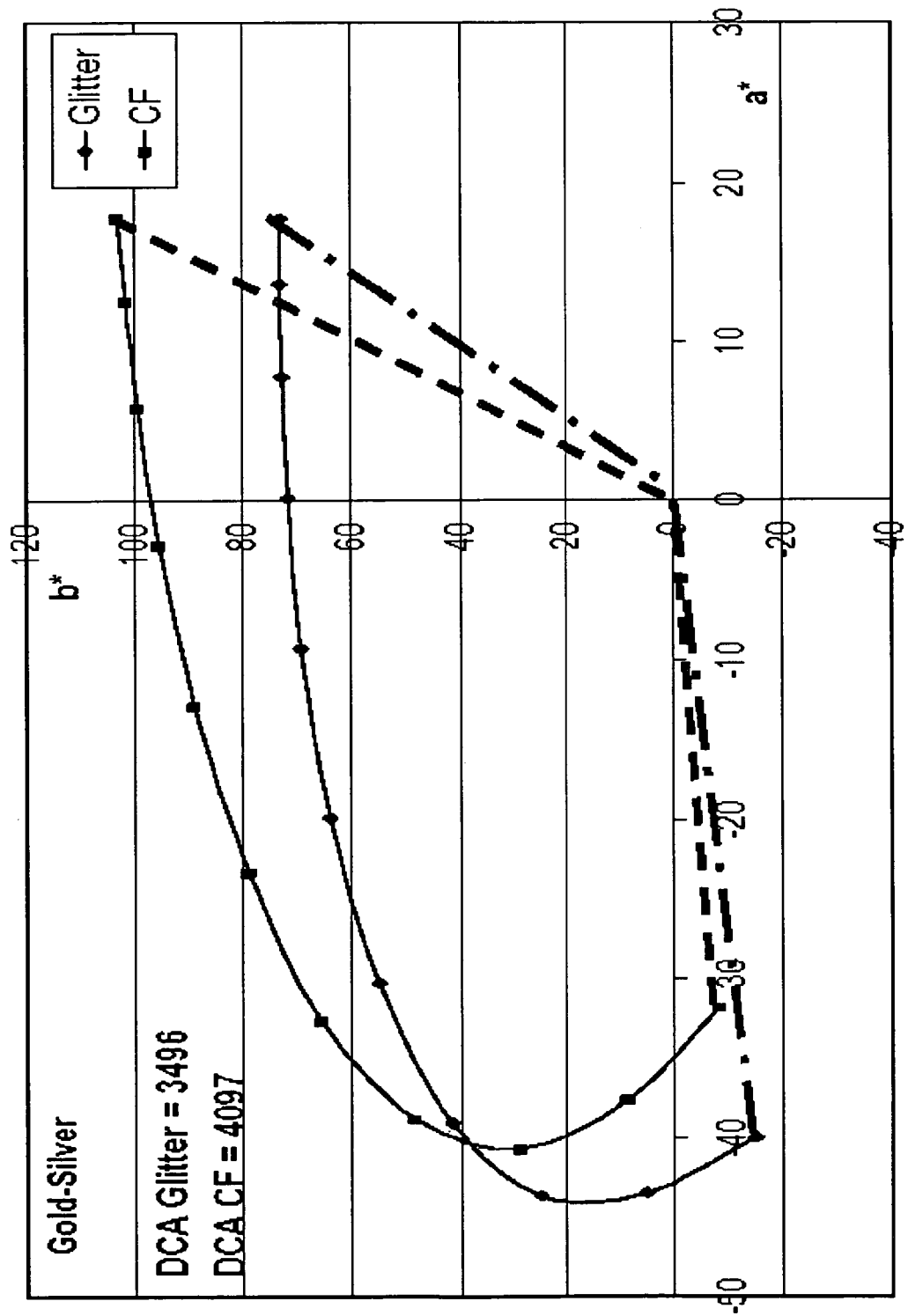
FIG. 16 is a graph illustrating results obtained using a GO-SL design for color shifting glitter and flakes using the geometry shown in FIG. 15.

FIG. 16 shows the results obtained using this geometry in the case of the GO-SL design. Despite the visual appearance of these samples (see FIG. 10), the color trajectory seems to be following similar paths, showing hue values at near normal (15°/5°) and at high angles (65°/55°) close to each other. Another figure of merit normally used is the so called the DCA (Dynamic Color Area). This value represents the area under the a, b color shifting trajectory with respect to the (0,0) coordinates. The DCA is limited by the lines for the hues corresponding to the (15°/5°) and the (65°/55°) values and the zero coordinates. The DCA values are again close to each other, 3,496 and 4,097 for paint with optically variable flake and optically variable glitter particles, respectively. For this geometry, we also see that the color travel and the DCA values are essentially identical.

Figure 17:
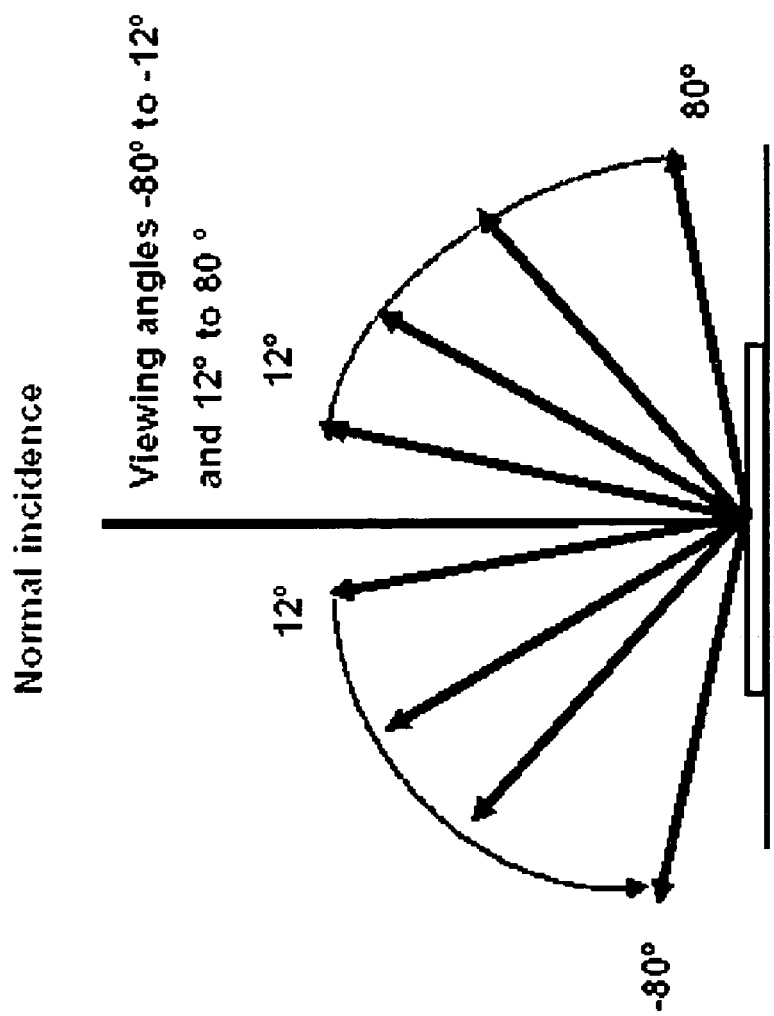
FIG. 17 shows another geometry that is used to illustrate the difference between a "metallic" looking versus a "glitter or sparkly" visual appearance.
Figure 18:
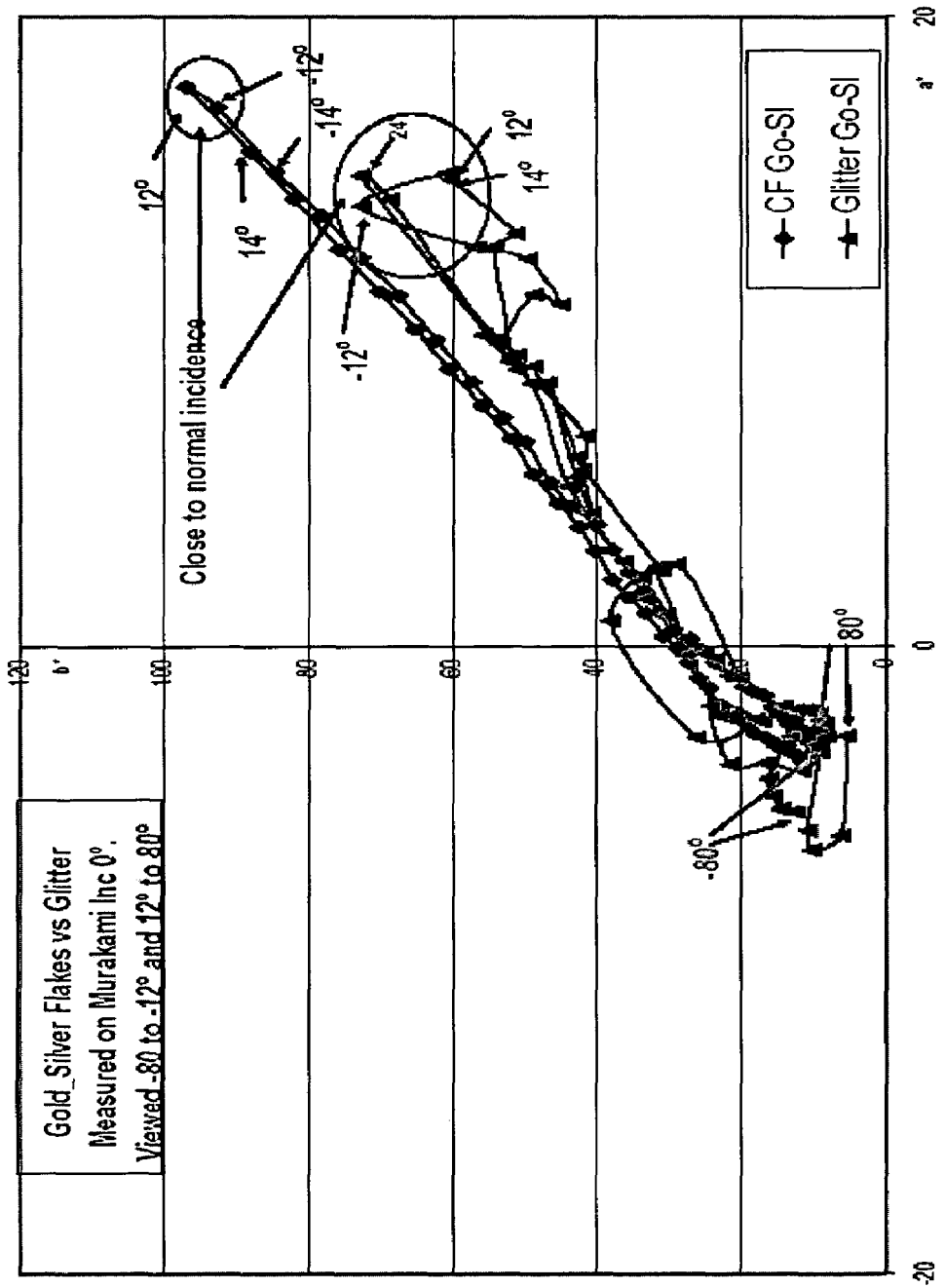
FIG. 18 is a graph illustrating results obtained using a GO-SL design for color shifting glitter and flakes using the geometry showed on FIG. 17
Figure 19A:
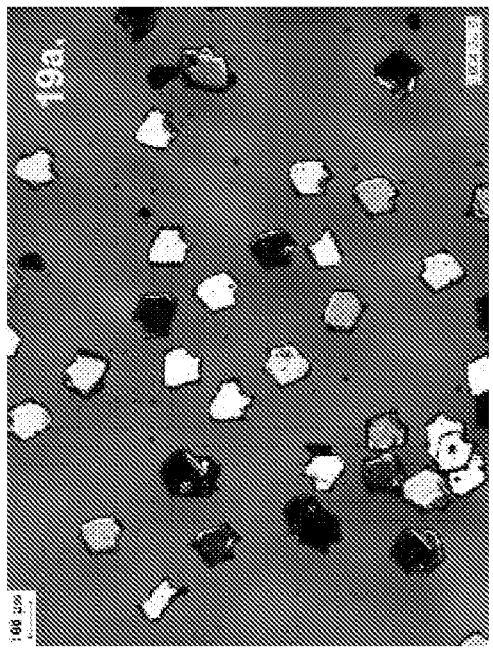
FIGS. 19a, b, and c are optical micrographs of a GO-SL design color shifting glitter with a hexagonal shape and particle sizes of 100, 150 and 400 microns respectively.
Figure 19B:
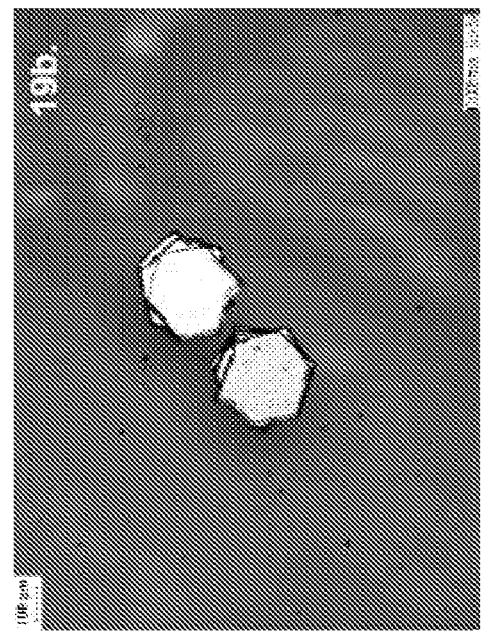
Figure 19C:
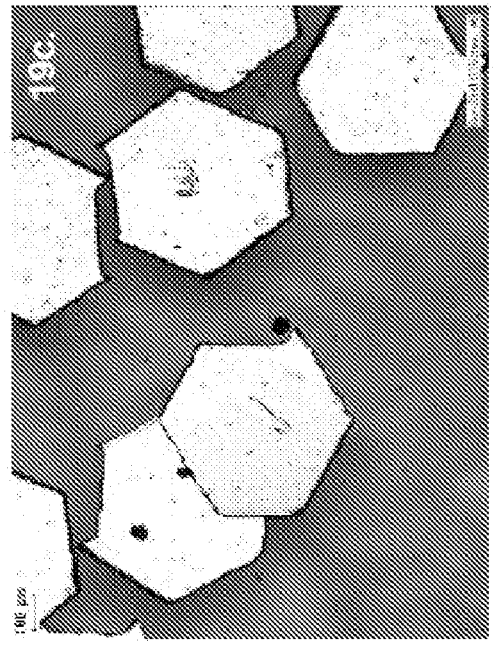

Method 3. Illumination at 0 degrees and reflection at all other angles:

FIG. 18 shows the results obtained when using a geometry than FIG. 17. This method of characterization illustrating the difference between a "metallic" looking versus a "glitter or sparkly" visual appearance. In this geometry, the samples were illuminated at normal incidence and the viewer was scanned from −80 to −12 and from 12 to 80 degrees in two degree increments on each side of the normal incident illumination. The gold-to-silver paint with optically variable flakes shows a high chroma when the viewing angle is close to normal and fades progressively when viewed away from the normal. Notice that points corresponding to each side of the normal, such as, −80°/80°, −70°/70°, etc. up to −12°/12°, close to normal incidence, are basically the same. This is characteristic of a metallic appearance. The color variation is small for all the points on each side of the normal (12 to 80 vs. −12 to −80), but the intensity for each side decreases as the viewing angle is increased away from the specular reflection. Notice also, that the points in each side of the normal follow parallel trajectories demonstrating a good leafing and flat alignment of the flakes. With the paint with the gold-to-silver glitter particles the optical performance is quite different. Even though there is a global tendency of the sample to fade in color when viewed at high angles, away from the normal incidence; the trajectory of the curves on each side of the normal is not symmetrical. Glitter particles do not lie as flat as optically variable flakes, and each time that a set of flakes are disoriented with respect to the normal of the sample, this set will reflected light in a different orientation; that is the glittering or sparkly effect away from the normal at higher viewing angles to be detected by the detector of the equipment as a different color (see points corresponding to 12° and −12° and 14° and 24° as example).

Finally, it is important to note that just after the stripping process to obtain flakes in the conventional manner, particles with a D50 of only about 50 microns are obtained, that are grinded to around a D50 of 20 microns for most of traditional applications related to paints and inks.

In other words, the vacuum method that deposited a multilayer stack of inorganic materials (metal/dielectric/metal) followed by stripping, grinding and classification, to obtain totally opaque color shifting flakes of the type of Fabry-Perot interference filters do not produce particle size as big as the particles that can be obtained in a organic/inorganic composites as the glitter does. Thus this illustrates some of the limitations of the un-supported opaque, all inorganic color shifting particles.

This invention provides a method and product whereby opaque uniform color shifting particles are inexpensively provided.

Of course numerous other embodiments may be envisaged without departing from the spirit and scope of the invention.

What is claimed is:

1. Opaque color shifting glitter comprising particles, cut such that their shape and size is substantially uniform, said particles each comprising an inorganic thin film optical interference structure for providing a perceivable color shift with a change in viewing angle or angle of incident light, in the visible spectrum, wherein said inorganic thin film interference structure of each particle is supported by an organic support layer for providing rigidity and for preventing the particles from curling and wherein the inorganic thin film interference structure of each particle is only on one side of the organic support layer.

2. Opaque color shifting as defined in claim 1 wherein each particle has length across its surface of 30 microns or more, and wherein the thickness of the particles are at least 6 microns.

3. Opaque color shifting glitter as defined in claim 2, wherein the thin film interference structure is a Fabry-Perot interference structure.

4. Opaque color shifting glitter as defined in claim 2, wherein the thin film interference structure includes two Fabry-Perot interference structures.

5. Opaque color shifting glitter as defined in claim 4, wherein the two Fabry-Perot structures share a common reflector layer.

6. Opaque color shifting glitter as defined in claim 4, wherein the Fabry-Perot structures each have a dielectric layer and wherein the thicknesses of the dielectric layers are substantially different.

7. Opaque color shifting glitter as defined in claim 1 wherein the inorganic thin film optical interference structure is a layer of optically variable ink.

8. Opaque color shifting glitter as defined in claim 1, wherein the organic support layer has a diffraction grating or a holographic structure formed therein.

9. Opaque color shifting glitter as defined in claim 8, wherein the diffraction grating or the holographic structure is formed on a surface of the organic support layer and wherein the inorganic thin film optical interference structure supported by the organic support layer has the diffraction grating or the holographic structure formed in at least a layer thereof.

10. Opaque color shifting glitter as defined in claim 9, wherein the organic support layer is light transmissive and wherein the inorganic thin film interference structure comprises a color shifting Fabry-Perot structure that can be seen from both sides of a particle.

11. Opaque color shifting glitter as defined in claim 8, wherein the diffraction grating or the holographic structure is formed on a first face of the organic support layer and wherein the inorganic thin film optical interference structure is supported on an opposite face of the organic support layer.

12. Opaque color-shifting glitter comprising particles having: an organic support layer and;
 a) two single or double period Fabry-Perot structures sharing a same reflector layer on only one side of the organic support layer or
 b) an optically variable color shift ink on only one side of the organic support layer.

13. Opaque color shifting glitter as defined in claim 12, wherein the particles each comprise two symmetrical optically variable structures (SOVSs) each SOVS including an inner reflector layer and an outwardly facing absorber layer, and a dielectric layer disposed there between, said particles each having an diameter "d" of at least 30 microns, and a thickness "t" of more than 6 microns wherein t<d/2, the organic support layer providing rigidity for preventing the particles from curling and for lessening chipping and breaking of the particles.

14. Opaque color shifting glitter as defined in claim 13, wherein the two symmetrical SOSVs share an inner reflector layer.

* * * * *